United States Patent
Yasuda et al.

(10) Patent No.: US 7,345,258 B2
(45) Date of Patent: Mar. 18, 2008

(54) BEAM WELDING APPARATUS AND BEAM WELDING METHOD

(75) Inventors: Ryosuke Yasuda, Shizuoka (JP); Fujihiko Sugiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 73 days.

(21) Appl. No.: 11/301,739

(22) Filed: Dec. 13, 2005

(65) Prior Publication Data

US 2006/0134994 A1  Jun. 22, 2006

(30) Foreign Application Priority Data

Dec. 17, 2004  (JP) ............... 2004-365817

(51) Int. Cl.
   *B23K 26/20* (2006.01)
(52) U.S. Cl. .............. 219/121.63; 219/121.64
(58) Field of Classification Search .......... 219/121.63, 219/121.64; 156/272.2, 272.8
   See application file for complete search history.

(56) References Cited

U.S. PATENT DOCUMENTS

| | | | |
|---|---|---|---|
| 4,578,554 A * | 3/1986 | Coulter .................. | 219/121.63 |
| 4,636,609 A | 1/1987 | Nakamata | |
| 5,840,147 A | 11/1998 | Grimm | |
| 6,054,072 A | 4/2000 | Bentley et al. | |
| 6,465,757 B1 * | 10/2002 | Chen ..................... | 219/121.63 |
| 6,592,239 B1 * | 7/2003 | Akiyama et al. ........ | 156/272.8 |
| 2003/0196750 A1 * | 10/2003 | Sakai et al. ............. | 156/272.8 |
| 2004/0089638 A1 * | 5/2004 | Tanaka ................... | 219/121.6 |

FOREIGN PATENT DOCUMENTS

| | | |
|---|---|---|
| EP | 1 306 196 A1 | 5/2003 |
| JP | 63-151432 A | 6/1988 |
| JP | 2001-246488 A * | 9/2001 |
| JP | 2004-216839 A * | 8/2004 |

OTHER PUBLICATIONS

Notice from the Chinese Patent Office for Chinese Patent Application 2005101317518, Issued Mar. 2, 2007, and English translation thereof, 13 pages.

* cited by examiner

*Primary Examiner*—Geoffrey S. Evans
(74) *Attorney, Agent, or Firm*—Osha Liang LLP

(57) ABSTRACT

A beam welding apparatus for welding a housing and transparent cover of a vehicular lighting device via beam welding has a cover fixing jig having a beam transmitting part, configured to fix a position of a transparent cover and configured to press the transparent cover toward a housing with a welding part of the transparent cover overlaid on a welding part of the housing while it is arranged on the transparent cover. The beam welding apparatus also has a beam irradiating part configured to irradiate beams onto the welding part of the housing through the beam transmitting part and the transparent cover to excite and heat the welding part of the housing. The beam transmitting part has a shielding part configured to shield unnecessary luminous flux among the beams irradiated toward the welding part of the housing from the beam irradiating part.

14 Claims, 3 Drawing Sheets

BEAM WELDING APPARATUS AND BEAM WELDING METHOD

BACKGROUND OF THE INVENTION

1. Technical Field

The present invention relates to novel beam welding apparatus and a technique to perform reliable welding as well as improving the appearance of a welded portion.

2. Related Art

Beam welding, for example laser welding, has attracted people's attention because it offers various advantages concerning the joining of a housing and a transparent cover of a vehicular lighting device over the joining techniques including joining, hot plate welding, and welding by way of oscillation of ultrasonic waves or the like that have been practiced in the related art.

For example, in the case where a housing and a transparent cover of a vehicular lighting device are joined together via laser welding, the exemplary process mentioned below is used because the housing and the transparent cover are relatively large and the joining site has a complicated three-dimensional shape. A laser gun is supported by a 6-shaft articulated robot to perform control of the position and posture of the laser gun. A housing and a transparent cover overlaid one on the other are rotated in a horizontal plane (with vertical movement as appropriate) as the laser gun irradiates laser beams while scanning a welding line (this continues through all of the positions where the welding part of the housing and the welding part of the transparent cover are in contact with each other).

As mentioned above, the housing and the transparent cover are relatively large and the joining site has a complicated three-dimensional shape. Besides that, variations in the dimensions or shape of each product, the problems of teaching a scanning robot, swinging of a controlled robot and other problems may cause laser irradiation off the welding line.

For example, as shown in FIG. 3A, laser beams fare successfully irradiated by a laser gun a onto the welding surface e of a housing d in contact with the welding surface of a transparent cover b. As shown in FIG. 3B, when the laser gun is deflected inward, the laser beams f are irradiated onto a portion g inside the welding surface e of the housing d thus causing a scorch on the portion g. As shown in FIG. 3C, when the laser gun is deflected outward, the laser beams f are irradiated onto a portion h outside the welding surface e of the housing d thus causing a scorch on the portion h. In FIG. 3, a sign i represents a cover fixing jig for pressing the transparent cover b toward the housing d in order to secure mutual contact between the welding surfaces c and e.

A scorched portion g or h mentioned above results in a considerably poor appearance. Moreover, a gas may be generated when a scorch occurs. The gas may cause a fog on the transparent cover b. This presents a problem with safety.

In case the laser gun a is deflected farther inward or outward than shown in FIG. 3B or 3C, the irradiation position of the laser beams is completely dislocated from the welding line and the target position is left non-welded. Such a welding-lacking portion prevents a space defined by the housing and the transparent cover from being enclosed thus impairing the water-resistance.

SUMMARY OF THE INVENTION

In view of the above, one or more embodiments of the invention eliminate the problems of irradiation of laser beams off a welding line and a lack of irradiation of laser beams onto the welding line.

In accordance with one or more embodiments of the invention a beam welding apparatus is provided comprising: a cover fixing jig including a beam transmitting part, for pressing a transparent cover toward a housing with the welding part of the transparent cover overlaid on the welding part of the housing while it is arranged on the transparent cover; and a beam irradiating part for irradiating beams onto the welding part of the housing through the beam transmitting part and the transparent cover to excite and heat the welding part of the housing; characterized in that the beam transmitting part includes a shielding part for shielding unnecessary luminous flux among the beams irradiated toward the welding part of the housing from the beam irradiating part formed therein.

In accordance with one or more embodiments of the invention a beam welding method is provided comprising steps of: overlaying the welding part of the transparent cover on the welding part of the housing and, arranging a cover fixing jig including a beam transmitting part on the transparent cover, and pressing the transparent cover toward the housing; irradiating beams onto the welding part of the housing through the beam transmitting part and the transparent cover to excite and heat the welding part of the housing via irradiation of the beams, heating also the welding part of the transparent cover via the heating in order to join the two welding parts in a compatibilized state; characterized in that residual beams obtained after unnecessary luminous flux is shielded by the shielding part formed in the beam transmitting part among the beams irradiated by the beam irradiating part is irradiated onto the welding part of the housing.

According to one or more embodiments of the invention, the residual beams obtained after unnecessary luminous flux is shielded by the shielding part formed in the beam transmitting part among the beams irradiated by the beam irradiating part is irradiated onto the welding part of the housing.

One or more embodiments of the invention provide a beam welding apparatus that welds the housing and transparent cover of a vehicular lighting device via beam welding, the apparatus comprising: a cover fixing jig including a beam transmitting part, for pressing a transparent cover toward a housing with the welding part of the transparent cover overlaid on the welding part of the housing while it is arranged on the transparent cover; and a beam irradiating part for irradiating beams onto the welding part of the housing through the beam transmitting part and the transparent cover to excite and heat the welding part of the housing; characterized in that the beam transmitting part includes a shielding part for shielding unnecessary luminous flux among the beams irradiated toward the welding part of the housing from the beam irradiating part.

One or more embodiments of the invention provide abeam welding method that welds the housing and transparent cover of a vehicular lighting device via beam welding, the method comprising steps of: overlaying the welding part of the transparent cover on the welding part of the housing and, arranging a cover fixing jig including a beam transmitting part on the transparent cover, and pressing the transparent cover toward the housing; and irradiating beams onto the welding part of the housing through the beam transmitting part and the transparent cover to excite and heat the welding part of the housing via irradiation of the beams, heating also the welding part of the transparent cover via the heating in order to join the two welding parts in a compatibilized state; characterized in that residual beams obtained after unnecessary luminous flux is shielded by the shielding part formed in the beam transmitting part among the beams irradiated by the beam irradiating part is irradiated onto the welding part of the housing.

Thus, in accordance with one or more embodiments of the invention, it is possible to reliably prevent irradiation of beams onto a portion off the welding part of the housing and accordingly prevent a scorch from being caused in a portion off the welding part of the housing or gas from being generated, because the shielding part and the welding part of the housing are closely positioned as long as the shielding part corresponds to a portion off the welding part of the housing. Even in case the spot diameter of a beam irradiated by the beam irradiating part is made larger than the width of the welding part of the housing, unnecessary beams are shielded by the shielding part. Thus, by making the spot diameter sufficiently large it is possible to avoid loss of irradiation onto the welding part of the housing despite some degree of deflection of the beam irradiation position, thereby preventing possible loss of welding.

According to one or more embodiments of the invention, the shielding part is formed on the top surface of the cover fixing jig. Thus the shielding part does not come into contact with the transparent cover so that the presence of the shielding part does not scratch the transparent cover. Forming the shielding part with a material having a good heat transmission property such as a metal contributes to dissipation of heat accumulated on the shielding part or beam transmitting part by irradiation of beams.

According to one or more embodiments of the invention, the shielding part is arranged along both sides of an area for transmitting beams and the beam irradiating part has its position and posture controlled by a robot.

DETAILED DESCRIPTION OF THE INVENTION

Figure 1:
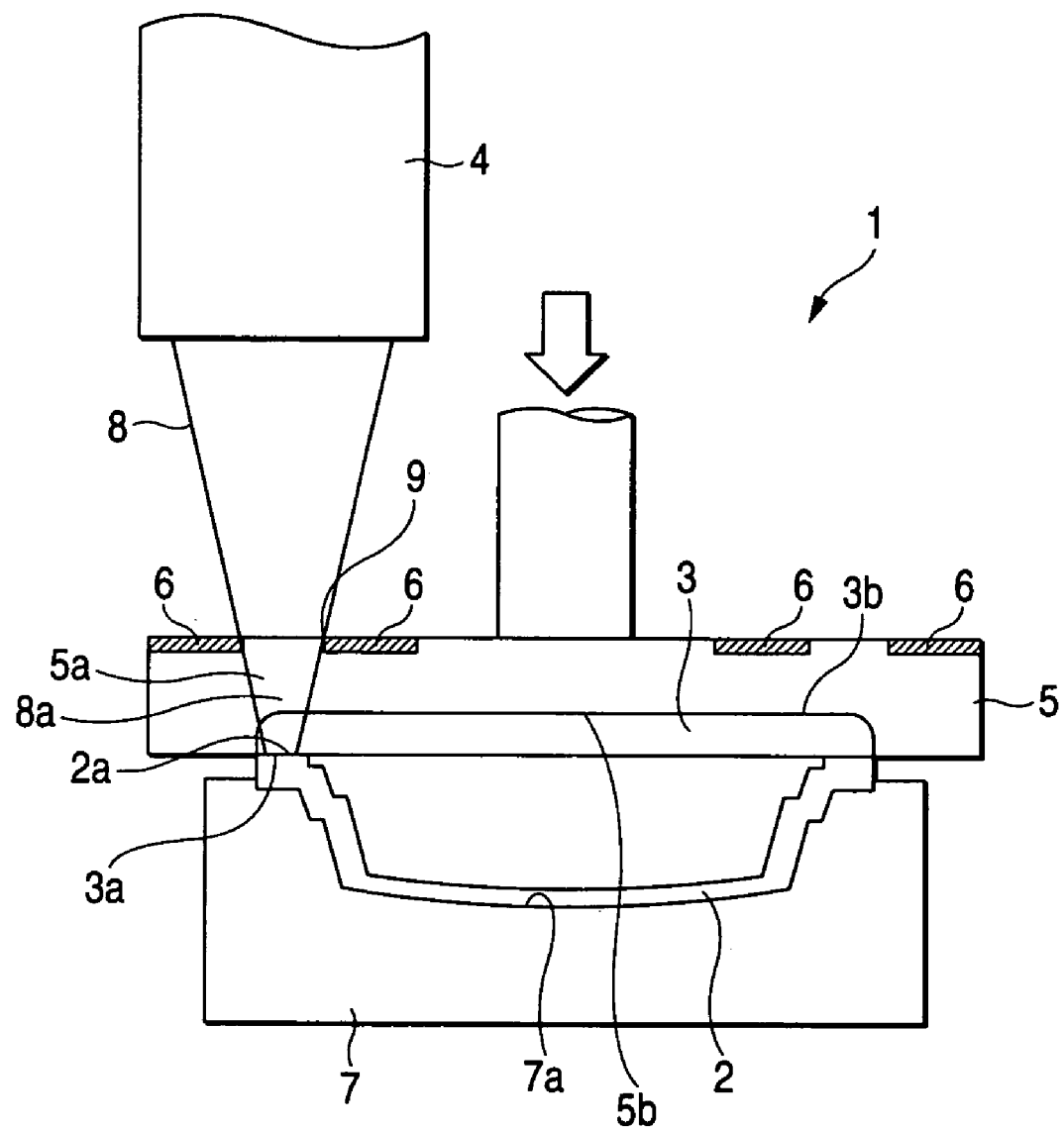
FIG. 1 is schematic cross-sectional view of a beam welding apparatus according to an embodiment of the invention.

Embodiments for implementing the beam welding apparatus and the beam welding method according to the invention will be described in detail below with reference to the figures.

The beam welding apparatus 1 is used to weld a transparent cover 3 to cover the opening of a housing 2 of a vehicular lighting device and the housing 2.

The beam welding apparatus 1 comprises a beam irradiating part 4. The beam irradiating part 4 irradiates coherent or incoherent electromagnetic waves such as laser beams, visible light, ultraviolet rays, or infrared rays. An appropriate beam welding apparatus 1 is selected depending on the material resin of the transparent cover 3 as a beam transmitting material or the housing 2 that is excited by irradiation of the electromagnetic wave.

The beam welding apparatus 1 comprises a cover fixing jig 5 for pressing the transparent cover 3 toward the housing 2 with the welding surface 3a as the welding part of the transparent cover 3 overlaid on the welding surface 2a as the welding part of the housing 2. A portion of the cover fixing jig 5 corresponding to the welding surface 3a of the transparent cover 3 is formed of a transparent material and serves as a beam transmitting part 5a. The beam transmitting part 5a should be formed at least in the above portion although the entire cover fixing jig may be formed of a transparent material. The material that constitutes the beam transmitting part 5a is preferably a material having a deflection index almost the same as that of the transparent cover 3. In the illustrated embodiment, the entire cover fixing jig 5 is formed of a transparent material.

On the top surface of the cover fixing jig 5 is formed a shielding part 6. In this embodiment, the shielding part 6 is formed by joining a material that does not transmit beams, such as a metal plate and/or a ceramic plate on both sides of a portion corresponding to the welding surface 3a of the transparent cover. The cover fixing jig 5 may be also formed by so-called two-color molding that uses a light-transmitting resin and a non-light-transmitting resin. From the viewpoint of heat dissipation, the shielding part is preferably formed of a metal plate.

The housing 2 is placed in a recessed part 7a of a housing fixing jig 7 having the recessed part 7a receiving the rear surface of the housing 2. The transparent cover is overlaid on the housing 2 so that the welding surfaces 2a and 3a of the housing 2 and the transparent cover 2 will come into contact with each other. The cover fixing jig 5 is overlaid on the transparent cover 3 with the bottom surface 5b of the cover fixing jig 5 coming into contact with the front surface 3b of the transparent cover 3 and the cover fixing jig energized downward in the state to press the transparent cover 3 against the housing 2. This brings the welding surface 3a of the transparent cover 3 into contact with the welding surface 2a of the housing 2.

Appropriate beams (electromagnetic waves) are irradiated onto the welding surface 2a of the housing 2 by the beam irradiating par 4 through the beam transmitting part 5a of the cover fixing jig 5 and the transparent cover 3. The material resin of the housing 2 is a material having a molecular structure of a radical whose vibration period is the same as the wavelength of the electromagnetic wave to be irradiated, or at least a material in which such a material is mixed. Thus, the welding surface 2a is excited and heated by irradiation of an electromagnetic wave. In case the material resin of the housing 2 absorbs the irradiated electromagnetic wave only poorly, a material having property of good absorption of the electromagnetic wave may be applied or attached to the welding surface 2a. To the contrary, the material of the transparent cover 3 or the beam irradiating part 5b is preferably a material having a property of poor absorption of the irradiated electromagnetic wave.

As mentioned above, when the welding surface 2a of the housing is heated by irradiation of beams from the beam irradiating part 4, the heat is transmitted to the welding surface 3a (surface in contact with the welding surface 2a of the housing) of the transparent cover 3, which heats both welding surfaces 2a and 3a thus leading to a compatibilized state. On the interface where the two surfaces 2a and 3a are in contact, the resin material of the housing 2 and that of the transparent cover 3 are integrated.

Figure 2A:
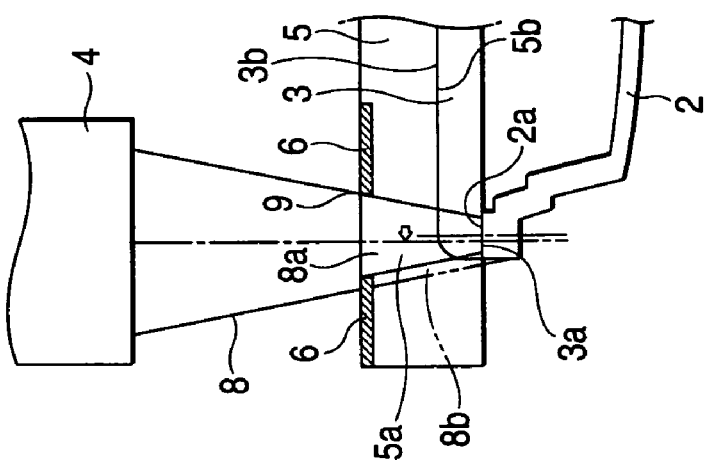
FIG. 2A-2C show schematic cross-sectional views of the main parts for illustrating the operation of the beam welding apparatus according to an embodiment of the invention.
Figure 2B:
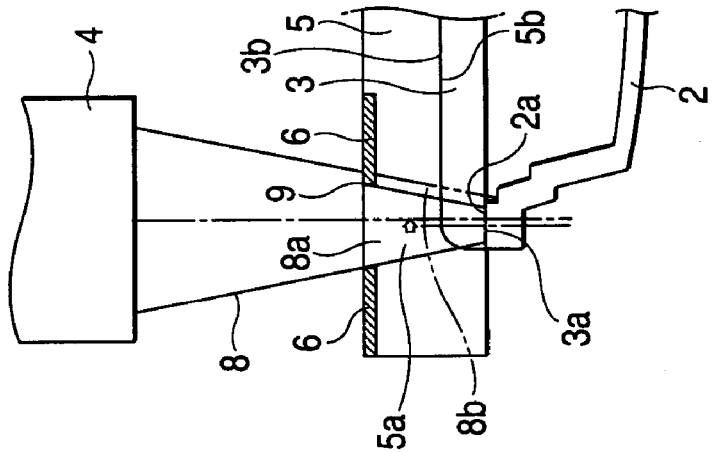
Figure 2C:
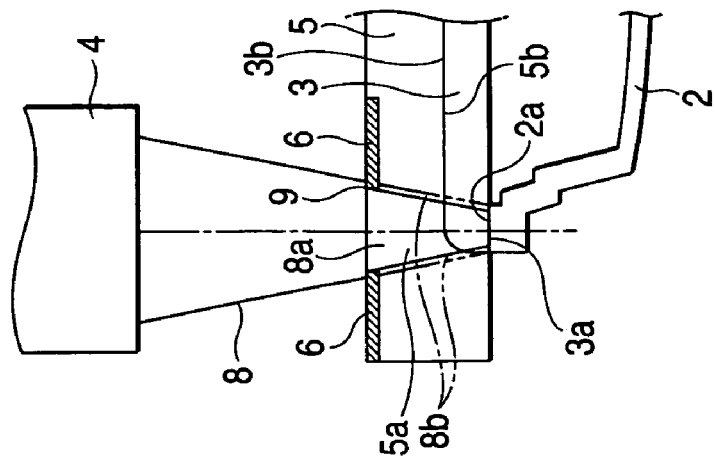
Figure 3C:
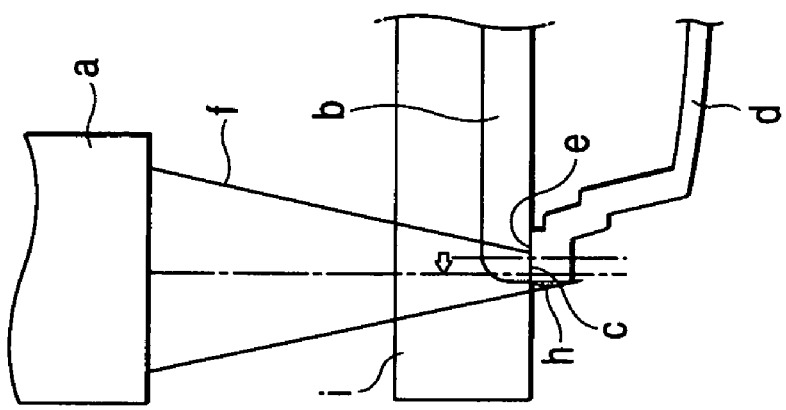
FIG. 3A-3C show schematic cross-sectional views of the main parts of the beam welding apparatus according to an embodiment of the invention.
Figure 3B:
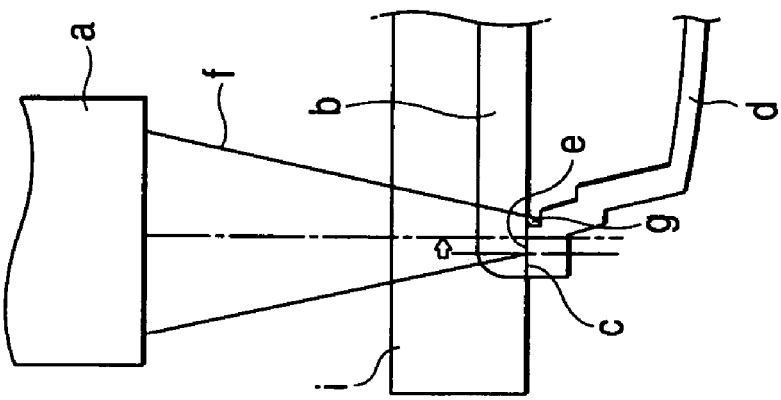
Figure 3A:
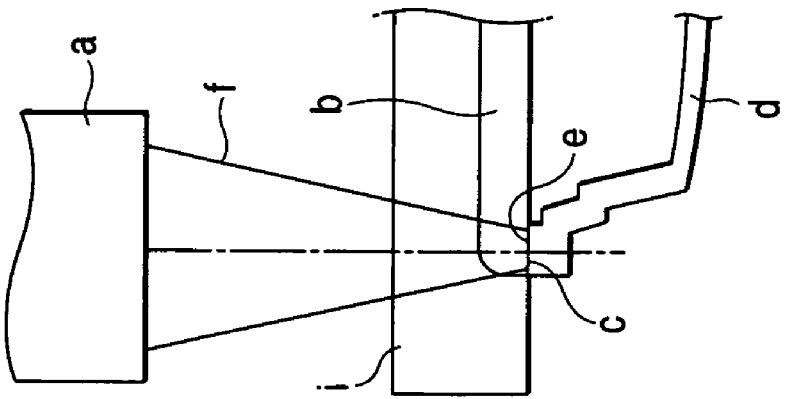

In the beam welding apparatus 1, the shielding part 6 is provided in the beam transmitting part 5a of the cover fixing jig 5. The beams 8a not shielded by the shielding part 6 alone are irradiated onto the welding surface 2a of the housing 2. For example, FIG. 2A shows a state where the beams 8 are precisely scanned along the welding line. In this figure, the luminous flux 8b shielded by the shielding part 6 among the beams emitted from the beam irradiating part 4 is not transmitted by the beam transmitting part 5a of the cover fixing jig 5. A portion 9 that transmits beams between the shielding parts 6 and 6 is formed precisely corresponding to the welding surface 2a of the housing 2 so that beams are reliably irradiated onto the welding surface 2a of the housing 2. For example, even in case the irradiation position of the beams 8 is deflected inward as shown in FIG. 2B or outward as shown in FIG. 3C, the beams 8a that have passed through the portion 9 between the shielding parts 6 and 6 are irradiated onto the welding surface 2a of the housing 2. This prevents beams from being irradiated onto an unexpected portion of the housing 2 and causing a scorch. For example, by setting the irradiation diameter of the beams 8 larger than the width of the welding surface 2a of the housing 2 in consideration of the maximum value of swinging of control of a robot (not shown) for scanning the beams 8 while supporting the beam irradiating part 4, the entire welding surface 2 receives beams even in the presence of some deflection of scanning of the beams 8, thereby eliminating a non-welded portion.

The shielding part 6 is formed on the top surface of the cover fixing jig 5. Thus the shielding part 6 does not come into contact with the transparent cover so that the presence of the shielding part does not scratch the surface of transparent cover 3. Forming the shielding part 6 with a material having a good heat transmission property such as a metal contributes to dissipation of heat accumulated on the shielding part 6 or beam transmitting part 5a by irradiation of beams.

The shielding part 6 may be provided along the entire length of the welding line, although such an arrangement is not compulsory. The welding line includes an area where the position and posture of the beam irradiating part 4, for example a laser gun, must be changed frequently and to a great extent and an area where a small change of the position and posture suffices or there is almost no need to change the position and posture. In the latter case, even without a shielding part 6, it rarely happens that beams are irradiated in excess of the welding surface 2a or off the welding 2a. Thus, the shielding part 6 may be provided, in some cases, only in an area where the position and posture of the beam irradiating part 4 must be changed frequently and to a great extent.

Again, the shape and structure of each part shown in the foregoing examples are only exemplary embodiments of the invention and these should not be construed as limiting the technical scope of the invention.

The invention allows reliable joining of the housing and the transparent cover of a large-sized vehicular lighting device.

We claim:

1. Beam welding apparatus for welding a housing and transparent cover of a vehicular lighting device via beam welding, said apparatus comprising:

a cover fixing jig comprising a beam transmitting part, configured to fix a position of a transparent cover and configured to press the transparent cover toward a housing with a welding part of the transparent cover overlaid on a welding part of the housing while it is arranged on the transparent cover; and a beam irradiating part configured to irradiate beams onto the welding part of the housing through the beam transmitting part and the transparent cover to excite and heat the welding part of the housing;

wherein said beam transmitting part comprises a shielding part configured to shield unnecessary luminous flux among the beams irradiated toward the welding part of the housing from the beam irradiating part.

2. The beam welding apparatus according to claim 1, wherein the shielding part is formed on the top surface of the cover fixing jig.

3. The beam welding apparatus according to claim 2, wherein the shielding part is arranged along both sides of an area for transmitting beams, and further comprising a robot for controlling the position and posture of said beam irradiating part.

4. The beam welding apparatus according to claim 1, wherein the shielding part is arranged along both sides of an area for transmitting beams, and and further comprising a robot for controlling the position and posture of said beam irradiating part.

5. The beam welding apparatus according to claim 1, wherein the shielding part is arranged along an entirety of a path over which the beams are irradiated.

6. The beam welding apparatus according to claim 1, wherein the cover fixing jig further comprises a recess configured to receive at least a portion of the transparent cover.

7. The beam welding apparatus according to claim 6, wherein the recess has a shape corresponding to a shape of the transparent cover.

8. A beam welding method for welding a housing and transparent cover of a vehicular lighting device via beam welding, said method comprising steps of:

overlaying a welding part of the transparent cover on a welding part of the housing and, arranging a cover fixing jig comprising a beam transmitting part on the transparent cover, fixing the transparent cover in position with the cover fixing jig, and pressing the transparent cover toward the housing; and irradiating beams onto the welding part of the housing through the beam transmitting part and the transparent cover to excite and heat the welding part of the housing via irradiation of the beams, heating also the welding part of the transparent cover via the heating in order to join the two welding parts in a compatibilized state;

wherein residual beams obtained after unnecessary luminous flux are shielded by a shielding part formed in the beam transmitting part among the beams irradiated by the beam irradiating part is irradiated onto the welding part of the housing.

9. The beam welding method according to claim 8, wherein the shielding part is formed on the top surface of the cover fixing jig.

10. The beam welding method according to claim 9, wherein the shielding part is arranged along both sides of an area for transmitting beams and a robot controls a position and posture of the beam irradiating part.

11. The beam welding method according to claim 8, wherein the shielding part is arranged along both sides of an area for transmitting beams, and a robot controls a position and posture of the beam irradiating part.

12. The beam welding method according to claim 8, wherein the shielding part is arranged along an entirety of a path over which the beams are irradiated.

13. The beam welding method according to claim 8, wherein the fixing the transparent cover in position with the cover fixing jig comprises disposing at least a portion of the transparent cover in a recess formed in the cover fixing jig.

14. The beam welding method according to claim 8, wherein the fixing the transparent cover in position with the cover fixing jig comprises disposing at least a portion of the transparent cover in a recess having a shape corresponding to a shape of the transparent cover formed in the cover fixing jig.

* * * * *